(12) United States Patent
Cheng et al.

(10) Patent No.: US 11,527,093 B2
(45) Date of Patent: Dec. 13, 2022

(54) ELECTRONIC APPARATUS WITH DISPLAY SCREEN

(71) Applicants: BEIJING XIAOMI MOBILE SOFTWARE CO., LTD. NANJING BRANCH, Nanjing (CN); BEIJING XIAOMI MOBILE SOFTWARE CO., LTD., Beijing (CN)

(72) Inventors: Chih-Jen Cheng, Beijing (CN); Zhongsheng Jiang, Beijing (CN); Di Wang, Beijing (CN)

(73) Assignees: BEIJING XIAOMI MOBILE SOFTWARE CO., LTD. NANJING BRANCH, Nanjing (CN); BEIJING XIAOMI MOBILE SOFTWARE CO., LTD., Beijing (CN)

(*) Notice: Subject to any disclaimer, the term of this patent is extended or adjusted under 35 U.S.C. 154(b) by 204 days.

(21) Appl. No.: 16/764,882

(22) PCT Filed: Jul. 31, 2019

(86) PCT No.: PCT/CN2019/098721
§ 371 (c)(1),
(2) Date: May 18, 2020

(87) PCT Pub. No.: WO2021/016951
PCT Pub. Date: Feb. 4, 2021

(65) Prior Publication Data
US 2021/0406509 A1    Dec. 30, 2021

(51) Int. Cl.
*G06V 40/12* (2022.01)
*G06V 40/13* (2022.01)
(Continued)

(52) U.S. Cl.
CPC .............. *G06V 40/13* (2022.01); *G02B 5/04* (2013.01); *G02B 5/10* (2013.01)

(58) Field of Classification Search
CPC ............. G06V 40/13; G02B 5/04; G02B 5/10
See application file for complete search history.

(56) References Cited

U.S. PATENT DOCUMENTS

2018/0012069 A1* 1/2018 Chung ................ G06V 10/145
2018/0276444 A1* 9/2018 Sun .................... G06V 40/1318
(Continued)

FOREIGN PATENT DOCUMENTS

| CN | 1900949 A | 1/2007 |
| CN | 109740496 A | 5/2019 |

(Continued)

OTHER PUBLICATIONS

English machine translation document of CN-109886228-A (Year: 2019).*

(Continued)

*Primary Examiner* — Stephen G Sherman
(74) *Attorney, Agent, or Firm* — Syncoda LLC; Feng Ma (57) ABSTRACT

An electronic apparatus, includes: a display screen, a reflector and a sensor, wherein a region of the display screen located on a front surface of the electronic apparatus is a first display region, a region of the display screen located on a back surface of the electronic apparatus is a second display region, and the display screen is configured to transmit light; the reflector and the sensor are arranged inside the electronic apparatus, and light transmitted from the first display region or the second display region is reflected by the reflector and then irradiated on the sensor; and the sensor generates an electric signal for fingerprint identification based on the light received. Sharing the sensor under the display screen can therefore be realized, with a single sensor to implement fingerprint collection and identification of a multi-surface display device.

13 Claims, 4 Drawing Sheets

(51) Int. Cl.
*G02B 5/04* (2006.01)
*G02B 5/10* (2006.01)

(56) References Cited

U.S. PATENT DOCUMENTS

2018/0293452 A1\* 10/2018 Chung ................. G06V 10/245
2019/0163953 A1\* 5/2019 Jin ..................... G06V 40/1324

FOREIGN PATENT DOCUMENTS

CN 109886228 A \* 6/2019
CN 109886228 A 6/2019

OTHER PUBLICATIONS

Extended European Search Report in Application No. 19883332.9, dated Jul. 15, 2022.

\* cited by examiner

ELECTRONIC APPARATUS WITH DISPLAY SCREEN

CROSS-REFERENCE TO RELATED APPLICATION

The present application is a national stage of International Application No. PCT/CN2019/098721 filed on Jul. 31, 2019, the disclosure of which is hereby incorporated by reference in its entirety.

TECHNICAL FIELD

The present disclosure relates to a field of electronic technologies, and more specifically to an electronic apparatus.

BACKGROUND

Display screens of electronic apparatuses such as mobile phones are no longer provided on one surface of the devices, and electronic apparatuses with display screens both on front and back are gradually emerging, which makes fingerprint identification through front and back screens become a requirement.

For example, a wraparound display screen is a brand-new display solution of mobile phone. In the related arts, the wraparound display screen surrounds the mobile phone, so that the mobile phone has a display screen both on front and back. Screen-to-body ratio of mobile phone with a wraparound display screen is much greater than that with a single-sided display screen, and correspondingly, space for a fingerprint identification module in the mobile phone employing a wraparound display screen is greatly compressed. How to set up the fingerprint identification module in the limited space to implement fingerprint identification through the front and back screens has become a problem to be solved.

SUMMARY

In order to overcome the problems in the related art, the present disclosure provides an electronic apparatus.

According to a first aspect of the embodiments of the present disclosure, there is provided an electronic apparatus, including: a display screen, a reflector and a sensor, wherein the electronic apparatus includes a plurality of surfaces, the display screen includes a first display region and a second display region that are respectively located on different surfaces of the electronic apparatus, and the display screen can transmit light;

the reflector and the sensor are arranged inside the electronic apparatus, and light transmitted from the first display region and the second display region is reflected by the reflector and then irradiated on the sensor; and the sensor is configured to generate an electric signal for fingerprint identification based on the light received.

In a probable implementation, a first lens and a second lens are further arranged inside the electronic apparatus, wherein the first lens is configured to converge light transmitted from the first display region to the reflector, and the second lens is configured to converge light transmitted from the second display region to the reflector.

In a probable implementation, the reflector includes a first reflecting prism and a second reflecting prism;

light transmitted from the first display region is capable of being reflected by a reflecting surface of the first reflecting prism and then irradiated on the sensor; and/or light transmitted from the second display region is capable of being reflected by a reflecting surface of the second reflecting prism and then irradiated on the sensor.

In a probable implementation, the reflecting surface of the first reflecting prism is a concave surface, and/or, the reflecting surface of the second reflecting prism is a concave surface.

In a probable implementation, the reflector includes a first concave mirror and a second concave mirror;

light transmitted from the first display region is capable of being reflected by a reflecting surface of the first concave mirror and then irradiated on the sensor; and/or light transmitted from the second display region is capable of being reflected by a reflecting surface of the second concave mirror and then irradiated on the sensor.

In a probable implementation, an outer surface of the display screen is covered with a transparent cover plate which can transmit light.

In a probable implementation, an inner surface of the display screen is provided with a display screen support, and a region of the display screen support opposite to the reflector can transmit light.

In a probable implementation, the display screen support is made of a transparent material.

In a probable implementation, the display screen support is made of a non-transparent material; and a region of the display screen support opposite to the reflector is provided with a through hole which can transmit light.

In a probable implementation, the through hole is filled with a transparent material.

The technical solutions provided by the embodiments of the present disclosure can include the following beneficial effects: according to the present disclosure, the reflector and the sensor are arranged inside the electronic apparatus, and the light transmitted from the first display region or the second display region located on different surfaces is reflected by the reflector and then irradiated on the sensor, so that the sensor generates the electric signal for fingerprint identification based on the light received. Therefore, a solution of sharing the sensor under the display screen is proposed, which only employs a single sensor to implement fingerprint collection and identification at display region on different surface of the display device, occupying a small space without additional sensors, so that the hardware cost is greatly reduced. Moreover, the present disclosure does not need to open holes in the display screen, which effectively increases the effective display region of the display screen, and further increases the hermeticity and mechanical strength of the electronic apparatus.

It should be understood that the above general description and the following detailed description are exemplary and explanatory, and are not intended to limit the present disclosure.

BRIEF DESCRIPTION OF THE DRAWINGS

The accompanying drawings herein are incorporated in and constitute a part of this specification, illustrate the embodiments in conformity with the disclosure, and serve to explain the principles of the disclosure together with the specification.

DETAILED DESCRIPTION

Reference will now be made in detail to exemplary embodiments, examples of which are illustrated in the accompanying drawings. When the following description refers to the drawings, the same numbers in different drawings indicate the same or similar elements unless otherwise indicated. The implementations set forth in the following description of exemplary embodiments do not represent all the implementations consistent with the disclosure. On the contrary, they are merely examples of devices and methods consistent with some aspects of the disclosure as detailed in the appended claims.

Figure 1:
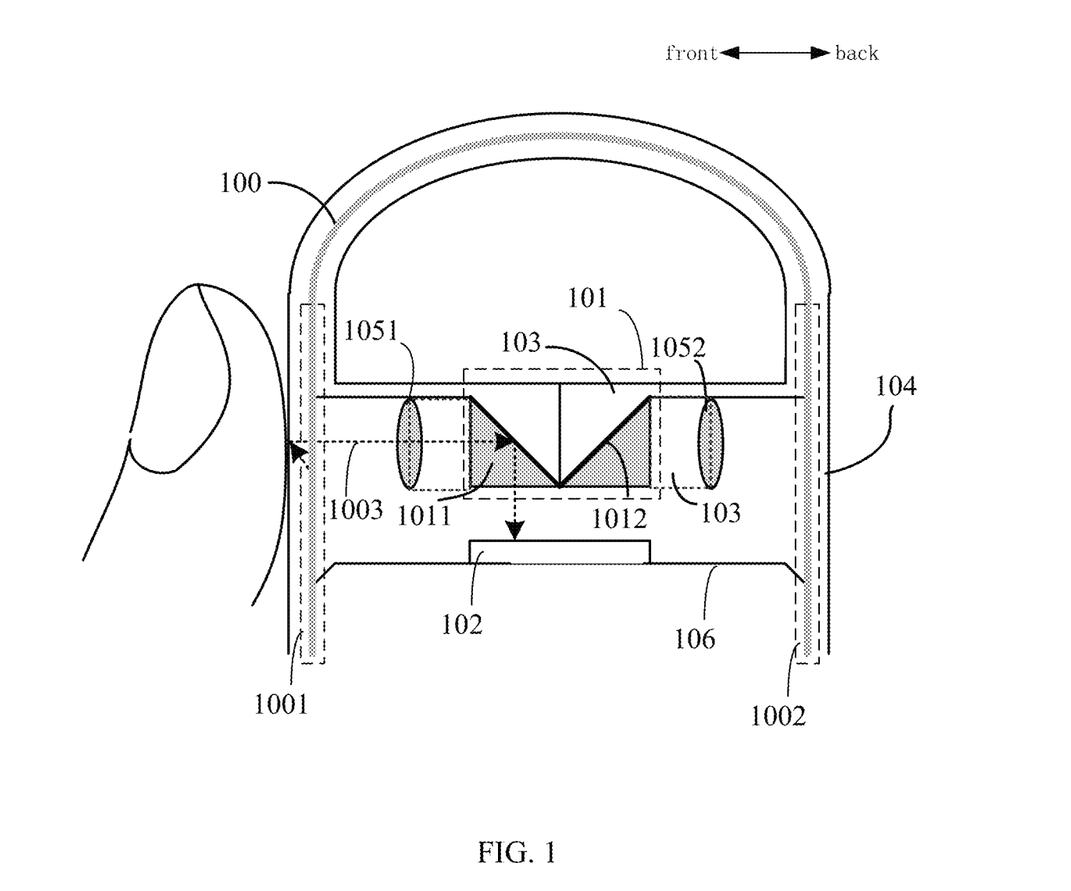
FIG. 1 is a partial schematic diagram of an electronic apparatus illustrated according to an exemplary embodiment.

FIG. 1 is a partial schematic diagram of an electronic apparatus illustrated according to an exemplary embodiment. The electronic apparatus may be a device such as a mobile phone, a tablet computer, a smart watch, a notebook computer, a desktop computer and the like, and the type of the electronic apparatus is not limited by the present disclosure.

As shown in FIG. 1, the electronic apparatus includes a plurality of surfaces. The electronic apparatus includes a display screen, a reflector and a sensor. The display screen includes a first display region 1001 and a second display region 1002 which are respectively located on different surfaces of the electronic apparatus, and the display screen can transmit light. The reflector 101 and the sensor 102 are arranged inside the electronic apparatus, and light transmitted from the first display region 1001 and the second display region 1002 is capable of being reflected by the reflector and then irradiated on the sensor 102. The sensor 102 is configured to generate an electric signal for fingerprint identification based on the light received.

In the present disclosure, the display screen may include any one of an OLED (Organic Light-Emitting Diode) display screen or an LED (Light Emitting Diode) display screen. It should be noted that the present disclosure does not limit the type of display screen as long as the display screen can transmit light.

Any two of the a plurality of surfaces of the electronic apparatus according to the embodiment of the present disclosure may be in a parallel relationship or have an included angle in any angle, and the a plurality of surfaces of the electronic apparatus may include planes and/or curved surfaces. The embodiment of the present disclosure does not limit the number and specific forms of the a plurality of surfaces of the electronic apparatus. For example, the electronic apparatus is a mobile phone, including a front surface, a back surface, an upper side surface, a lower side surface, a left side surface and a right side surface, wherein the first display region and the second display region in the embodiment of the present disclosure may be located in any two of the six surfaces.

In the embodiment of the present disclosure, the reflector may be represented as an optical element that changes a propagation direction of light by using the law of reflection of light. One or more reflectors may be provided in the embodiment of the present disclosure. Preferably, the reflectors may be respectively arranged corresponding to different display regions.

In the embodiment of the present disclosure, the sensor may be represented as a device that converts an optical image irradiated on a photosensitive surface of the sensor into an electric signal in a corresponding proportional relationship with the optical image by utilizing a photoelectric conversion function of a photoelectric device in the sensor. The sensor may include a CCD (Charge-coupled Device) sensor or a CMOS (Complementary Metal Oxide Semiconductor) sensor.

As an example of the embodiment, as shown in FIG. 1, the display screen 100 may cover a surface of the electronic apparatus, and the display screen 100 may transmit light. The electronic apparatus may include a front surface and a back surface, a region of the display screen 100 located on the front surface of the electronic apparatus may be taken as a first display region 1001 of the electronic apparatus, and a region of the display screen 100 located on the back surface of the electronic apparatus may be taken as a second display region 1002 of the electronic apparatus. The reflector 101 and the sensor 102 may be arranged inside the electronic apparatus (for example, the sensor 102 may be arranged on a mainboard 106 of the electronic apparatus, the reflector 101 may be suspended in a gap between the display screen 100 and the mainboard 106 of the electronic apparatus through a reflector support 103, and the reflector 101 may be arranged in a middle of the gap). Light transmitted from the first display region 1001 or the second display region 1002 is capable of being reflected by the reflector 101 and then irradiated on the photosensitive surface of the sensor 102. The sensor 102 may be configured to generate an electric signal for fingerprint identification based on the light received.

According to the present disclosure, the reflector and the sensor are arranged inside the electronic apparatus, and the light transmitted from the first display region or the second display region located on different surfaces is reflected by the reflector and then irradiated on the sensor, so that the sensor generates the electric signal for fingerprint identification based on the light received. Therefore, a solution of sharing the sensor under the display screen is proposed, which only employs a single sensor to implement fingerprint collection and identification at display region on different surfaces of the display device, occupying a small space without additional sensors, so that the hardware cost is greatly reduced. Moreover, the solution in the present disclosure does not need to open holes in the display screen, which effectively increases the effective display region of the display screen, and further increases the hermeticity and mechanical strength of the electronic apparatus.

In a probable implementation, the reflector may be an integrally formed optical device or may be formed by combining a plurality of optical devices through the reflector support. The reflector may include any one or more of a prism, a concave mirror and a plane mirror. The present disclosure does not limit the specific form of the reflector as long as the reflector can reflect the light transmitted from the first display region or the second display region onto the sensor.

As an example of the embodiment, a first lens and a second lens may further be arranged inside the electronic apparatus, wherein the first lens is configured to converge light transmitted from the first display region to the reflector, and the second lens is configured to converge light transmitted from the second display region to the reflector.

In the present disclosure, the lens may be represented as an optical element made of a transparent material (such as glass, crystal, etc.) the surface of which is a part of a spherical surface.

For example, as shown in FIG. 1, the first lens 1051 may be arranged between the reflector 101 and the first display region 1001 through the reflector support 103, and an incident surface of the reflector 101 close to the first display region 1001 may be arranged at a position of a focal plane of the first lens 1051, so that light 1003 transmitted from the first display region 1001 is converged to the reflector 101 via the first lens 1051, reflected by the reflector 101, and then irradiated on the sensor 102. The second lens 1052 may be arranged between the reflector 101 and the first display region 1001 through the reflector support 103, and an incident surface of the reflector 101 close to the second display region 1002 may be arranged at a position of a focal plane of the second lens 1052, so that light transmitted from the second display region 1002 is converged to the reflector 101 via the second lens 1052, reflected by the reflector 101, and then irradiated on the sensor 102.

As the first lens and the second lens have a condensing function, the first lens and the second lens can respectively increase an intensity of light incident into the reflector, so that the sensor can obtain an electric signal with a higher intensity according to the converged light to generate a clearer image to be identified, thereby improving the accuracy of fingerprint identification.

As an example of the embodiment, the reflector may include a first reflecting prism and a second reflecting prism; light transmitted from the first display region is capable of being reflected by a reflecting surface of the first reflecting prism and then irradiated on the sensor; and light transmitted from the second display region is capable of being reflected by a reflecting surface of the second reflecting prism and then irradiated on the sensor.

In the present disclosure, the prism may be represented as a transparent optical element surrounded by two planes that are intersected pairwise but not parallel to each other.

For example, as shown in FIG. 1, the first reflecting prism 1011 may include a first incident surface, a first reflecting surface, and a first exit surface, wherein the first incident surface may be parallel to a plane where the first display region 1001 is located, the first exit surface may be perpendicular to the plane where the first display region 1001 is located, and the photosensitive surface of the sensor 102 may be parallel to the first exit surface. The first reflecting surface may form a first acute angle and a second acute angle (for example, the first acute angle and the second acute angle may both be 45 degrees) with the first incident surface and the first exit surface respectively, so that the light 1003 incident from the first incident surface, after being reflected by the first reflecting surface, can be emitted from the first exit surface and irradiated on the sensor 102.

As shown in FIG. 1, the second reflecting prism 1012 may include a second incident surface, a second reflecting surface, and a second exit surface, wherein the second incident surface may be parallel to a plane where the second display region 1002 is located, the second exit surface may be perpendicular to the plane where the second display region 1002 is located, and the photosensitive surface of the sensor 102 may be parallel to the second exit surface. The second reflecting surface may form a third acute angle and a fourth acute angle (for example, the third acute angle and the fourth acute angle may both be 45 degrees) with the second incident surface and the second exit surface respectively, so that the light incident from the second incident surface, after being reflected by the second reflecting surface, can be emitted from the second exit surface and irradiated on the sensor 102.

The reflecting surface of the first reflecting prism is a plane or a concave surface, and/or, the reflecting surface of the second reflecting prism is a plane or concave surface.

Figure 2:
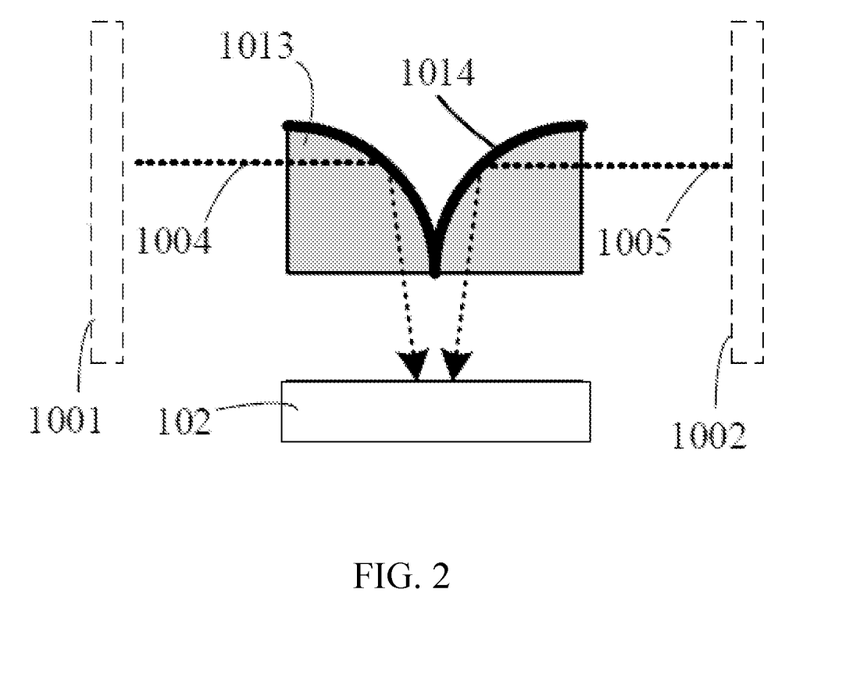
FIG. 2 is a schematic diagram of a reflector and a sensor in an electronic apparatus illustrated according to an exemplary embodiment.

FIG. 2 is a schematic diagram of the reflector and the sensor in an electronic apparatus illustrated according to an exemplary embodiment. As shown in FIG. 2, the reflector may include a first concave mirror 1013 and a second concave mirror 1014; light 1004 transmitted from the first display region 1001 is reflected by a reflecting surface of the first concave mirror 1013 and then irradiated on the sensor 102; and light 1005 transmitted from the second display region 1002 is reflected by a reflecting surface of the second concave mirror 1014 and then irradiated on the sensor 102.

As shown in FIG. 1 and FIG. 2, the first concave mirror 1013 may be arranged at a position of the first reflecting prism 1011 in the electronic apparatus as shown in FIG. 1, and the first concave mirror 1013 may include a third incident surface, a third reflecting surface, and a third exit surface, wherein the third incident surface may be parallel to the plane where the first display region 1001 is located, the third exit surface may be perpendicular to the plane where the first display region 1001 is located, and the photosensitive surface of the sensor 102 may be parallel to the third exit surface. The third reflecting surface may be an arc surface, and the third reflecting surface is convex in a direction away from the sensor 102, so that the light 1003 incident from the third incident surface, after being reflected by the third reflecting surface, can be emitted from the third exit surface, and then converged to and irradiated on the sensor 102.

As shown in FIG. 1 and FIG. 2, the second concave mirror 1014 may be arranged at a position of the second reflecting prism 1012 in the electronic apparatus as shown in FIG. 1, and the second concave mirror 1014 may include a fourth incident surface, a fourth reflecting surface, and a fourth exit surface, wherein the fourth incident surface may be parallel to the plane where the second display region 1002 is located, the fourth exit surface may be perpendicular to the plane where the second display region 1002 is located, and the photosensitive surface of the sensor 102 may be parallel to the fourth exit surface. The fourth reflecting surface may be an arc surface, and the fourth reflecting surface is convex in a direction away from the sensor 102, so that the light 1003 incident from the fourth incident surface, after being reflected by the fourth reflecting surface, can be emitted from the fourth exit surface, and then converged to and irradiated on the sensor 102.

In the present disclosure, compared with the first reflecting prism and the second reflecting prism, the first concave mirror and the second concave mirror can make an included angle between the reflected light and the incident light larger, that is, the first concave mirror and the second concave mirror can respectively converge the light from the first display region and the second display region to a smaller surface. Generally speaking, a photosensitive surface region of a sensor required by a reflecting prism with 1:1 mirror reflection prism used in a double-sided display screen is twice that of a sensor required by a single-sided display screen. In contrast, when the first concave mirror and the second concave mirror are used as the reflectors, the photosensitive surface region of the sensor required is smaller. In this way, a volume of the sensor is effectively reduced, the space inside the electronic apparatus is further saved, and the cost of the electronic apparatus is reduced.

In a probable implementation, as shown in FIG. 1, an outer surface of the display screen 100 may be covered with a transparent cover plate 104. For example, if the display screen 100 is a wraparound display screen 100, the transparent cover plate 104 may be of an integrally formed flat cylindrical structure, and the wraparound display screen 100 may be adhered to an inner side of the transparent cover plate 104. The transparent cover plate may have a higher hardness (e.g., the higher hardness may be Mohs hardness greater than 7) to support and protect the display screen 100, and has a higher light transmittance (e.g., the higher light transmittance may be greater than 80%), so that the transparent cover plate 104 does not need opening holes, will not affect the display screen 100 to transmit light, and can support and protect the display screen 100, such that the hermeticity and mechanical strength of the electronic apparatus are further improved.

In a probable implementation, a material of the transparent cover plate may include, for example, transparent glass, transparent hard plastic, etc.

Figure 3:
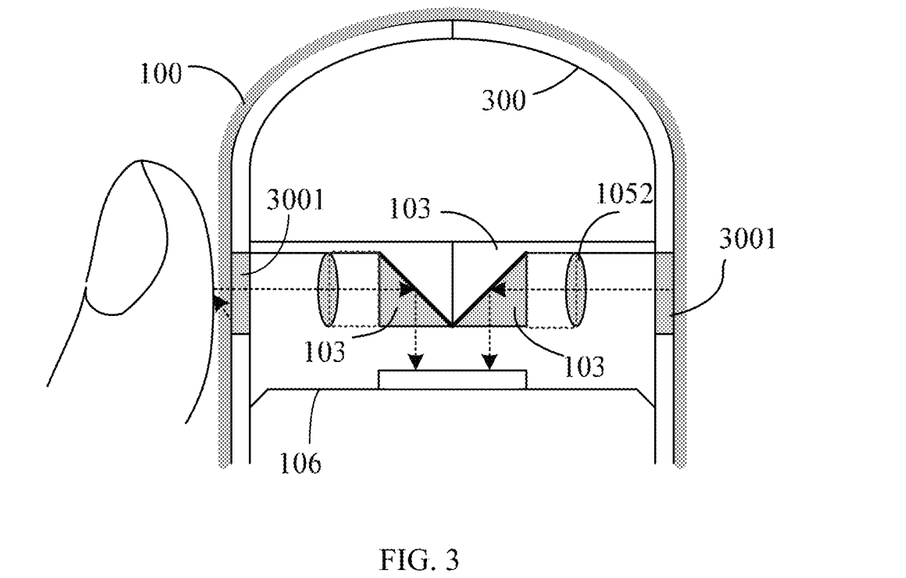
FIG. 3 is a partial schematic diagram of an electronic apparatus illustrated according to an exemplary embodiment.

FIG. 3 is a partial schematic diagram of an electronic apparatus illustrated according to an exemplary embodiment. As shown in FIG. 3, an inner surface of the display screen may be provided with a display screen support 300, and a region of the display screen support 300 opposite to the reflector 103 can transmit light.

For example, the display screen support may be made of a transparent material (for example, the transparent material may include transparent glass, transparent hard plastic, etc.), the display screen support may be arranged around the mainboard of the electronic apparatus, and may be covered by the display screen thereon. Since the display screen support made of the transparent material can shield less light transmitted from the display screen, there is no need to open holes in the region of the display screen support opposite to the reflector, thus maintaining the integrity of the display screen support and increasing the mechanical strength of the electronic apparatus.

For example, as shown in FIG. 3, the display screen support 300 may be made of a non-transparent material (for example, the non-transparent material may include a metallic material such as aluminum, aluminum alloy, or non-transparent hard plastic, etc.), the display screen support 300 may be arranged around the mainboard 106 of the electronic apparatus, and a through hole 3001 which can transmit light is arranged in the region of the display screen support 300 opposite to the reflector 103. Preferably, in order to further enhance the reliability of the electronic apparatus, the through hole 3001 may be filled with a transparent material (e.g., transparent glass, transparent hard plastic, etc.), and the display screen 100 may cover onto the display screen support 300. In this way, it is not necessary to limit the main material of the display screen support to the transparent material, thus enlarging a selection range of the main material of the display screen support.

Figure 4:
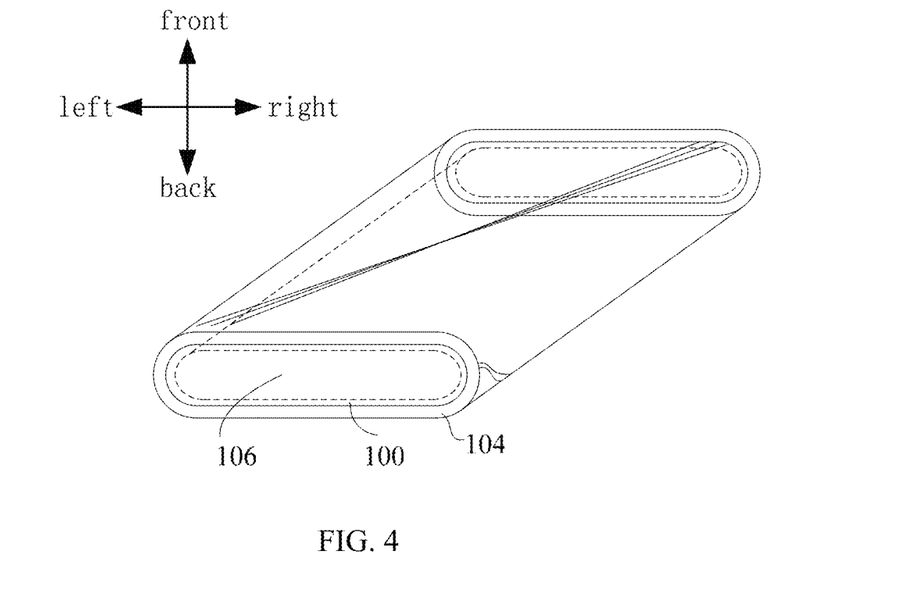
FIG. 4 is an overall schematic diagram of an electronic apparatus illustrated according to an application example.

FIG. 4 is an overall schematic diagram of an electronic apparatus illustrated according to one application example. As shown in FIG. 4, the display screen 100 may cover the front and back surfaces and the left and right side surfaces of the electronic apparatus.

For example, as shown in FIG. 1, the electronic apparatus may be a mobile phone, and the display screen 100 may be an OLED wraparound display screen. The display screen may surround the mainboard 106 of the mobile phone, and the outer surface of the display screen 100 may be covered with the transparent cover plate 104.

A gap may be formed between the display screen 100 and the mainboard 106 at one side of the mobile phone, and a cross section of the gap may be semi-circular or rounded rectangle. The first lens 1051, the second lens 1052, the first reflecting prism 1011, the second reflecting prism 1012 and the sensor 102 may be arranged in the gap, wherein the sensor 102 may be arranged on the mainboard 106 at the side of the mobile phone. The first lens 1051, the second lens 1052, the first reflecting prism 1011 and the second reflecting prism 1012 may be suspended in the gap through the reflector support 103.

The first lens 1051 may be located between the first display region 1001 and the first reflecting prism 1011, and a main optical axis of the first lens 1051 may be parallel to the plane where the first display region 1001 is located. The first reflecting prism 1011 may include a first incident surface, a first reflecting surface and a first exit surface. The first incident surface may be parallel to the plane where the first display region 1001 is located, and may be located at the position of the focal plane of the first lens 1051. The first exit surface may be perpendicular to the plane where the first display region 1001 is located, and the photosensitive surface of the sensor 102 may be parallel to the first exit surface. The first reflecting surface can reflect the light 1003 incident from the first incident surface, so that the reflected light can be emitted from the first exit surface and irradiated on the photosensitive surface of the sensor 102.

The second lens 1052 may be located between the second display region 1002 and the first reflecting prism 1011, and a main optical axis of the second lens 1052 may be parallel to the plane where the second display region 1002 is located. The second reflecting prism 1012 may include a second incident surface, a second reflecting surface and a second exit surface. The second incident surface may be parallel to the plane where the second display region 1002 is located, and may be located at the position of the focal plane of the second lens 1052. The second exit surface may be perpendicular to the plane where the second display region 1002 is located, and the photosensitive surface of the sensor 102 may be parallel to the second exit surface. The second reflecting surface can reflect the light 1003 incident from the second incident surface, so that the reflected light can be emitted from the second exit surface and irradiated on the photosensitive surface of the sensor 102.

When a tested object uses the mobile phone for fingerprint identification, the tested object may let a finger approach or attach to any one of the first display region 1001 or the second display region 1002 of the mobile phone. For example, as shown in FIG. 1, the tested object may attach the finger on the first display region 1001. The light 1003 emitted from the first display region 1001 is propagated to the finger through the transparent cover plate 104, reflected back by the finger, propagated back to the display screen 100 through the transparent cover plate 104, reaches the first lens 1051 under the display screen 100 through gaps between pixels of the display screen 100, and then is condensed by the first lens 1051, and incident into the first incident surface. After being reflected by the first reflecting surface, the light is emergent from the first exit surface and irradiated on the photosensitive surface of the sensor 102. The sensor 102 can generate an electric signal for fingerprint identification based on the light 1003 received and send the electric signal to a fingerprint identification chip of the mobile phone, so that the fingerprint identification chip can obtain a fingerprint identification result of the tested object according to the electric signal. In this way, a function of double-sided fingerprint detection can be implemented by using a single sensor, thus increasing the convenience in use.

It should be noted that in the above embodiment, the position of the first lens (second lens) is not limited to a first reflector (second reflector), as long as light can image on the sensor by, for example, the front or back of the first reflecting prism (second reflecting prism), a focal length, two concave surfaces of the first lens (second lens) and a curvature of a concave lens.

It should be noted that in the above embodiment, an entire optical system is designed based on the premise that the light transmitted from the display regions located on different surfaces, after passing through the optical system, are irradiated on the same sensor. Parameters such as the type of the optical device, the optical parameters of the optical device, the arrangement position, the relative position relationship between different devices, etc., may be appropriately adjusted based on different specific configurations of the electronic apparatus or different specific surfaces where the display regions are located. For example, the two lenses or the two prisms may be arranged in parallel or at a certain included angle.

It should be noted that in the present disclosure, it is not limited to that the light transmitted from the first display region and the second display region of the electronic apparatus, after passing through the optical system, is irradiated on the same sensor, display regions located on more planes may also be included, such as a third display region located on a plane different from the planes where the first display region and the second display region are located, and light transmitted from the three display regions, after passing through the optical system, is irradiated on the same sensor. A set of optical systems is equipped respectively corresponding to each display region, for example, a third lens and a third reflecting prism (or a third concave mirror) are arranged for the third display region.

Optionally, when the distribution positions of the display regions are appropriate, a set of optical systems may be equipped for a plurality of display regions. For example, a set of common optical systems may be provided for adjacent display regions (e.g., the front surface and the left side surface of the mobile phone), so that all the light transmitted through the adjacent display regions, after passing through the optical systems, can be irradiated on the same sensor.

Other embodiments of the disclosure will be apparent to those skilled in the art from consideration of the specification and practice of the invention disclosed here. This application is intended to cover any variations, uses, or adaptations of the disclosure following the general principles thereof and including such departures from the disclosure as come within known or customary practice in the art. The specification and embodiments are considered as exemplary only, and a true scope and spirit of the disclosure are indicated by the following claims.

It will be appreciated that the disclosure is not limited to the exact construction that has been described above and illustrated in the accompanying drawings, and that various modifications and changes can be made without departing from the scope thereof. The scope of the disclosure is limited by the appended claims only.

The invention claimed is:

1. An electronic apparatus, comprising a display screen, a reflector, and a sensor, wherein:
the electronic apparatus has a plurality of surfaces;
the display screen comprises a first display region and a second display region respectively located on different surfaces of the electronic apparatus;
the display screen is configured to transmit light;
the reflector and the sensor are arranged inside the electronic apparatus, and light transmitted from the first display region and the second display region is reflected by the reflector and then irradiated on the sensor;
the sensor is configured to generate an electric signal for fingerprint identification based on the light received; and
an inner surface of the display screen is provided with a display screen support, and a region of the display screen support opposing the reflector is configured to transmit light, wherein the display screen support is made of a transparent material without opening holes in the region of the display screen support opposing the reflector.

2. The electronic apparatus according to claim 1, wherein:
the reflector comprises a first reflecting prism and a second reflecting prism;
light transmitted from the first display region is capable of being reflected by a reflecting surface of the first reflecting prism and then irradiated on the sensor; and/or
light transmitted from the second display region is capable of being reflected by a reflecting surface of the second reflecting prism and then irradiated on the sensor.

3. The electronic apparatus according to claim 2, wherein the reflecting surface of the first reflecting prism is a concave surface, and/or, the reflecting surface of the second reflecting prism is a concave surface.

4. The electronic apparatus according to claim 3, wherein an outer surface of the display screen is covered with a transparent cover plate configured to transmit light.

5. The electronic apparatus according to claim 2, wherein an outer surface of the display screen is covered with a transparent cover plate configured to transmit light.

6. The electronic apparatus according to claim 1, wherein the reflector comprises a first concave mirror and a second concave mirror;
light transmitted from the first display region is capable of being reflected by a reflecting surface of the first concave mirror and then irradiated on the sensor; and/or
light transmitted from the second display region is capable of being reflected by a reflecting surface of the second concave mirror and then irradiated on the sensor.

7. The electronic apparatus according to claim 6, wherein an outer surface of the display screen is covered with a transparent cover plate configured to transmit light.

8. The electronic apparatus according to claim 1, wherein an outer surface of the display screen is covered with a transparent cover plate configured to transmit light.

9. The electronic apparatus according to claim 1, wherein the through hole is filled with a transparent material.

10. The electronic apparatus according to claim 1, wherein an outer surface of the display screen is covered with a transparent cover plate configured to transmit light.

11. The electronic apparatus according to claim 1, wherein the sensor is a single fingerprint sensor shared by the different surfaces of the electronic apparatus, thereby reducing space of the electronic apparatus.

12. The electronic apparatus according to claim 11, wherein the display screen does not have open holes, thereby increasing effective display region of the display screen, and increasing hermeticity and mechanical strength of the electronic apparatus.

13. The electronic apparatus according to claim 1, further comprising a first lens and a second lens arranged inside the electronic apparatus, wherein the first lens is configured to converge light transmitted from the first display region to the reflector, and the second lens is configured to converge light transmitted from the second display region to the reflector.

* * * * *